(12) United States Patent
Laine et al.

(10) Patent No.: US 8,509,411 B2
(45) Date of Patent: Aug. 13, 2013

(54) MANAGING GROUP OF LOCATION BASED TRIGGERS

(75) Inventors: Tommi A. Laine, Tampere (FI); Petri O. Rauhala, Tampere (FI); Pasi Katajainen, Tampere (FI); Jarno Luttinen, Tampere (FI)

(73) Assignee: Nokia Corporation, Espoo (FI)

( * ) Notice: Subject to any disclaimer, the term of this patent is extended or adjusted under 35 U.S.C. 154(b) by 1050 days.

(21) Appl. No.: 11/593,414

(22) Filed: Nov. 6, 2006

(65) Prior Publication Data

US 2008/0126334 A1 May 29, 2008

(51) Int. Cl.
*H04M 3/42* (2006.01)

(52) U.S. Cl.
USPC ............................ 379/207.12; 379/207.02

(58) Field of Classification Search
USPC .................... 700/94; 379/207.02, 207.12
See application file for complete search history.

(56) References Cited

U.S. PATENT DOCUMENTS

| | | | | |
|---|---|---|---|---|
| 5,610,822 | A * | 3/1997 | Murphy | 701/211 |
| 6,119,014 | A * | 9/2000 | Alperovich et al. | 455/466 |
| 6,311,194 | B1 * | 10/2001 | Sheth et al. | 715/236 |
| 6,553,310 | B1 * | 4/2003 | Lopke | 701/213 |
| 7,619,514 | B1 * | 11/2009 | Stone | 340/539.13 |
| 2003/0225589 | A1 * | 12/2003 | Eaton et al. | 705/1 |
| 2005/0043037 | A1 | 2/2005 | Ioppe et al. | |
| 2006/0014531 | A1 | 1/2006 | Nam et al. | |

FOREIGN PATENT DOCUMENTS

| | | |
|---|---|---|
| EP | 1 276 336 A2 | 1/2003 |
| EP | 1 276 336 A2 | 1/2003 |
| EP | 1276336 | 1/2003 |
| JP | 2001-339358 A | 12/2001 |
| JP | 2001-339358 A | 12/2001 |
| JP | 2003-32721 A | 1/2003 |
| JP | 2003-032721 A | 1/2003 |
| JP | 2004-102928 A | 4/2004 |
| JP | 2004-102928 A | 4/2004 |
| JP | 2004-364076 A | 12/2004 |
| JP | 2004-364076 A | 12/2004 |
| JP | 2006-79419 A | 3/2006 |
| JP | 2006-079419 A | 3/2006 |
| JP | 2006-303747 A | 11/2006 |

(Continued)

OTHER PUBLICATIONS

International Search report for PCT Application No. PCT/IB2007/054025, May 13, 2008.

(Continued)

*Primary Examiner* — Alexander Jamal
(74) *Attorney, Agent, or Firm* — Ditthavong Mori & Steiner, P.C.

(57) ABSTRACT

A location-based triggering system and method allow location-based triggers to be created and associated with POI, landmark, and/or location-based information categories comprised of a plurality of POIs, landmarks, and/or location-based information, POI, landmark, and/or location-based information sub-categories, as well as POI, landmark, and location-based information searches. A trigger is created, where the trigger comprises trigger criteria. At least one POI, landmark, and/or location-based information database containing a plurality of POIs, landmarks, and/or location-based information data is monitored for a match between the trigger criteria and at least one POI, landmark, and/or location-based information category. If a match exists, the trigger is activated, thereby executing a related action or event. Furthermore, additional search criteria can be combined with the trigger criteria to enhance the LBT process.

19 Claims, 5 Drawing Sheets

(56) References Cited

FOREIGN PATENT DOCUMENTS

| | | |
|---|---|---|
| JP | 2006-303747 A | 11/2006 |
| WO | WO 2006/007500 | 1/2006 |
| WO | WO 2008/036265 | 3/2008 |

OTHER PUBLICATIONS

Russian Office action for corresponding RU appln. No. 2009119285/09(026552) dated Jul. 9, 2010, pp. 1-7.

Korean Office action for corresponding KR application No. 10-2009-7011553 dated Nov. 24, 2010, pp. 1-4.

Canadian Office action for corresponding CA application No. 2,668,075 dated Dec. 20, 2010, pp. 1-2.

Japanese Office Action for corresponding JP Application No. 2009-535155, Jul. 25, 2011, pp. 1-9.

Korean Office Action for corresponding KR Application No. 10-2009-7011553 dated Sep. 29, 2011, pp. 1-6.

Chinese Office Action for Chinese Patent Application No. 200780041292.1 dated Dec. 7, 2011, pp. 1-13.

Office Action for related Chinese Patent Application No. 200780041292.1 dated Jul. 25, 2012, pp. 1-11.

Rejection Decision for Chinese Patent Application No. 200780041292.1, dated Nov. 5, 2012, pp. 1-8.

Office Action for related Canadian Patent Application No. 2,668,075 dated Jun. 20, 2012, pp. 1-3.

Office Action for related Japanese Patent Application No. 2009-535155 dated Jun. 20, 2012, pp. 1-8.

Office Action for related Japanese Patent Application No. 2009-535155 dated Feb. 27, 2013, pp. 1-3.

\* cited by examiner

MANAGING GROUP OF LOCATION BASED TRIGGERS

FIELD OF THE INVENTION

The present invention relates generally to the field of location-based services. More particularly, the present invention relates to categorizing and managing groups of location-based triggers.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Location based triggering (LBT) can be utilized when providing services for various users to define actions that are triggered based on physical locations of objects, people, or any other point of interest (POI). A trigger is generally activated when certain criteria related to that trigger is met, and various types of areas upon which a location-based trigger is based can be defined. For example, a circular area is defined by at least one center coordinate and a radius about the at least one center coordinate. An area can also be defined by a group of predetermined portions of a larger geographical area, such as a certain number of blocks within a particular city. In addition, a trigger can be set to activate for a user either upon entering a particular area or upon leaving the particular area. Activation of a trigger, as discussed above, occurs when certain trigger-related criteria is fulfilled. Upon activation of the trigger, some other action or event is triggered. For example, LBT can be used for launching a reminder to a user, e.g., upon entering department store, a notification reminding a user to buy a new umbrella is sent or shown to the user.

A POI is a specific location point that a user and/or other parties may find useful or interesting. A landmark can comprise a personal POI, or some other favorite place. Both POIs and Landmarks can be used in mapping and navigation software and applications. In addition, conventional POIs can be acquired from web/mobile business listings, city guides, etc., and are generally associated with map data. POIs and landmarks can also be categorized, where the categories can be as broad as "Restaurants" and "Public services," or more specific, such as "Chinese restaurants" and "Do-It-Yourself (DIY) shops." POIs and landmarks can also contain or be associated with other types of information besides location-related information, such as detailed descriptions of a particular POI, a web address associated with the particular POI, etc.

Conventionally, location-based triggers are tied to one or more specific coordinates and a surrounding area. Therefore, location-based triggers can be used to locate a specific place. However, many foreseeable scenarios exist where a user is not simply interested in a specific place, but rather a specific type of place with which a trigger may be associated. For example, a user may be interested in finding any gas station in a certain vicinity near the user's current location, as opposed to a specific gas station. Creating a single trigger and manually associating that trigger with several individual places can be both cumbersome and time consuming. Even the creation of a set of individual triggers has drawbacks, such as limiting performance optimization (i.e., memory and processing), because each individual trigger within the set of individual triggers must be separately handled. Furthermore, the usefulness and scope of LBT itself is limited when only specific POIs, landmarks, or locations are used a basis for triggers, as is the dynamic nature of LBT, where POIs that fulfill a triggering criteria may be added or removed during lifetime of the trigger.

SUMMARY OF THE INVENTION

The various embodiments of the present invention allow location-based triggers to be created and associated with POI, landmark, and/or location-based information categories comprised of a plurality of POIs, landmarks, location-based information, POI, landmark, and/or location-based information sub-categories, as well as POI, landmark, and location-based information searches. A trigger is created, where the trigger comprises trigger criteria. At least one dynamically updatable POI, landmark, and/or location-based information database and/or data structure containing a plurality of POIs, landmarks, and/or other location-based information data is monitored for a match between the trigger criteria and at least one POI and/or landmark category. If a match exists, the trigger is activated, thereby executing a related action or event. Furthermore, additional search criteria can be combined with the trigger criteria to enhance the LBT process. It should be noted that this ability to tie a trigger to multiple categories instead of one specific POI, landmark, or object increases the chance of trigger criteria being fulfilled. In turn the usability of LBT is also increased. Moreover, the possibility to select multiple, suitable places for a location-based trigger is faster and more convenient when compared to creating a number of separate location-based triggers.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE VARIOUS EMBODIMENTS

Figure 1:
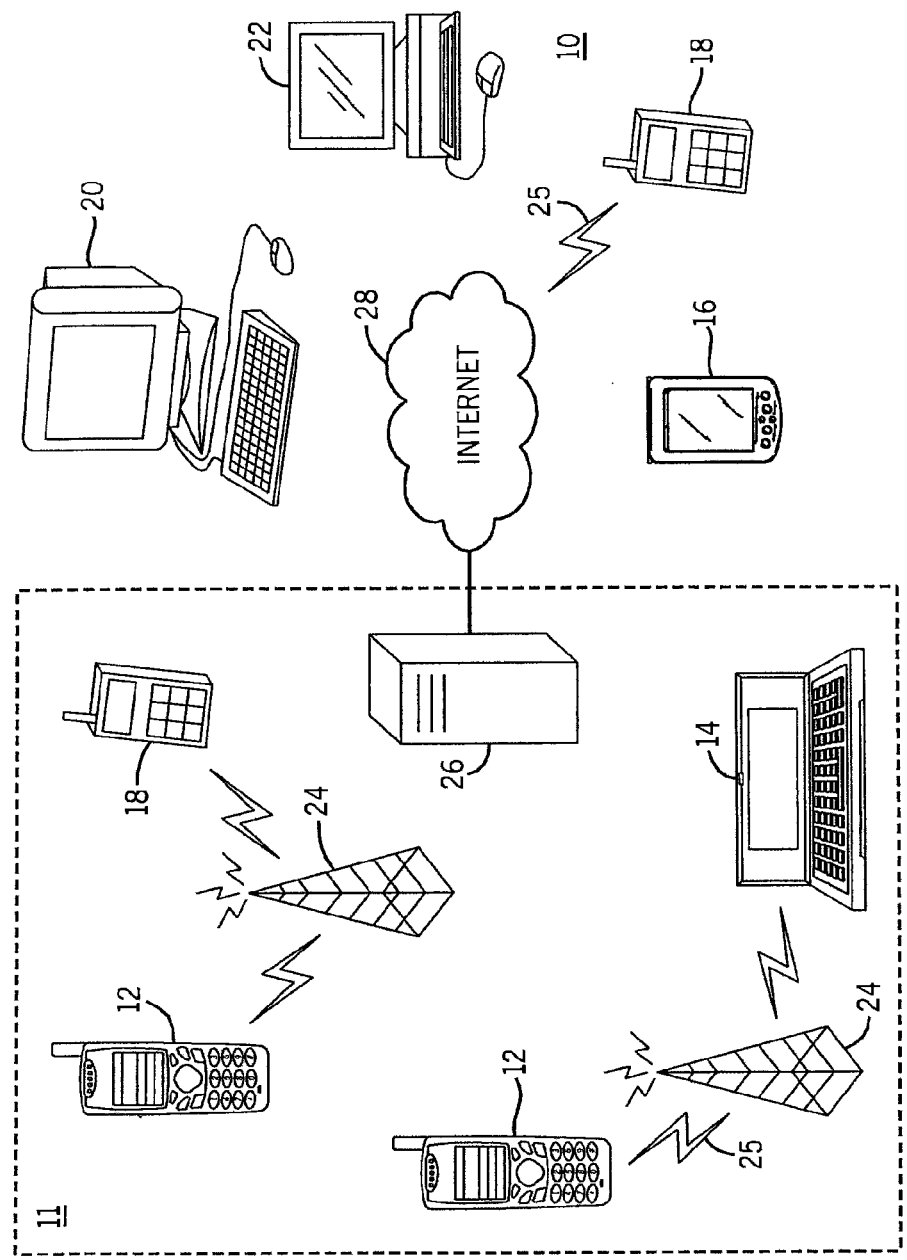
FIG. 1 is an overview diagram of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28.

Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile device 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
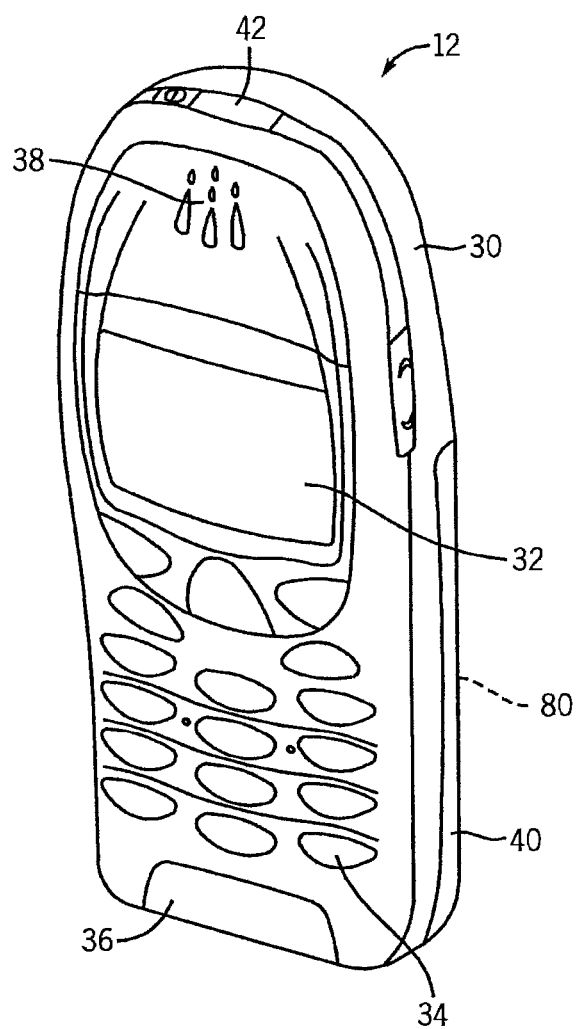
FIG. 2 is a perspective view of a mobile telephone that can be used in the implementation of the present invention.
Figure 3:
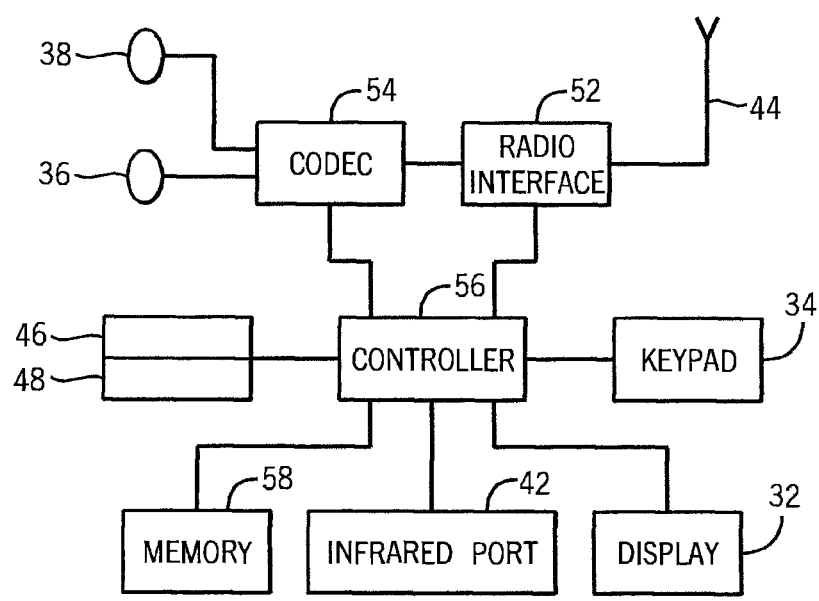
FIG. 3 is a schematic representation of the telephone circuitry of the mobile telephone of FIG. 2.

FIGS. 2 and 3 show one representative mobile device 12 within which the present invention may be implemented. It should be understood, however, that the present invention is not intended to be limited to one particular type of mobile telephone 12 or other electronic device. The mobile device 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The various embodiments of the present invention allow location-based triggers to be created and associated with POI, landmark, and/or location-based information categories comprised of a plurality of POIs, landmarks, and/or location-based information, POI, landmark, and/or location-based information sub-categories, as well as POI, landmark, and location-based information searches. The triggers can be associated with and support multiple categories simultaneously (e.g., a trigger can be tied to the categories "Shopping" and "DIY stores"). In addition, an action or event can be triggered by the trigger when either one, a subset, or all of the criteria associated with one or more categories are met. It should be noted that this ability to tie a trigger to multiple categories instead of one specific POI, landmark, or object increases the chance of trigger criteria being fulfilled. In turn the usability of LBT is also increased. Moreover, the possibility to select multiple, suitable places for a location-based trigger is faster and more convenient when compared to creating a number of separate location-based triggers. As described above, an object to which a trigger is tied does not have to be limited to conventional POIs and landmarks. For example, the location-based information associated with a contact can comprise another location source, where a category of contacts, where each contact is associated with location-based information can be utilized as a category in accordance with the various embodiments of the present invention. Therefore, any data comprising location or position-based information, or any data associated with location or position-based information can be searched by the various embodiments of the present invention.

Location-based trigger criteria fulfillment, according to the various embodiments of the present invention, can also be enhanced with defined searches such as a free text search. For example, a user can enter a text string which is used as criteria to fulfill a trigger associated with a particular place having a relation to the subject of the text string (e.g., a trigger for any place, either POI, landmark, or other object associated with location-based information where the word "power tool" is found to be associated with the place).

An example use case is as follows: If a user needs to buy an umbrella, simply selecting one shop is not meaningful, while selecting several individual shops can be cumbersome. With the various embodiments of the present invention, the user can generate a trigger for POIs associated with a "shopping" category. The search can be further enhanced by also utilizing a text search in connection with the "shopping" category POI search, such as indicating the term "accessories" as additional criteria. The user can then be sure that his or her trigger criteria is fulfilled correctly.

Figure 4:
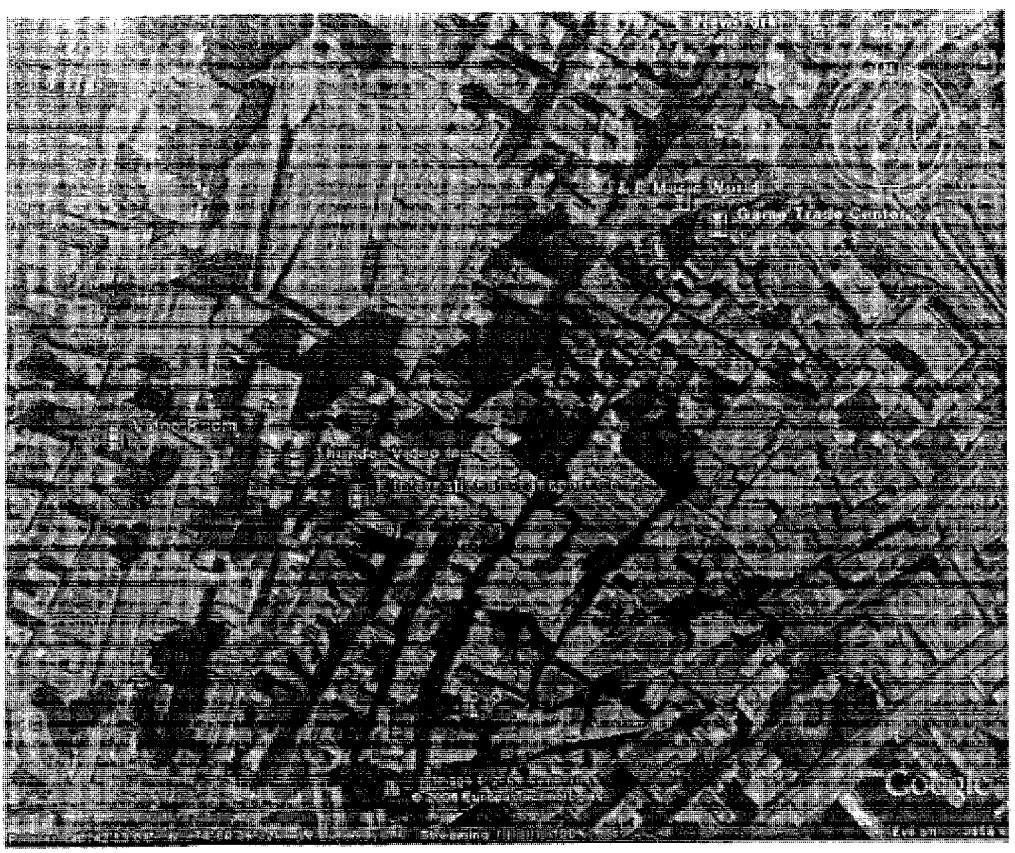
FIG. 4 illustrates an example result according to the use of one embodiment of the present invention.

Another example use case is as follows: A user wishes to purchase or rent a DVD/video, where several movie rental locations near the user's home carry the DVD/video. Instead of selecting all of the suitable movie rental locations, the user can simply select a "DVD/video rental" category and indicate some suitable radius around his home as trigger criteria. FIG. 4 illustrates a possible result of the user's query utilizing the trigger criteria.

The example use case described above can be further enhanced by adding more complex search criteria. For example, if the user wishes to by a new windshield wiper blade for his or her car, and he or she owns a discount card for a particular automotive supply store, the user can create a search indicating a desired category to be "shopping." In addition, the search can include text indicating the name of the particular automotive supply store. Furthermore, the user can tie this search to a triggering note, e.g., "Remember to buy new windshield wiper blade" that will be sent to a device utilized by the user, such as a personal digital assistant (PDA) or a mobile device. Additional information may be associated with the trigger criteria. Referring to the above example, an opening time of the automotive supply store can be added as an additional piece of search criteria/triggering condition that must be fulfilled before the trigger is fired. In this scenario for example, the trigger can be set to send the triggering note when the user is physically near one of the identified, particular automotive stores which is open at that same time. If the user is near one of the identified, particular automotive stores, but the store is not open for business, the trigger will not be activated.

It should be noted that an additional searching or search criteria need not be limited to the functionality of a device upon which the additional searching or search criteria is being performed and/or entered. Other data and information available from third party services providers and sources could be utilized as additional triggering criteria. For example, the various embodiments of the present invention can be utilized in conjunction with data gleaned from a semantic web browser. Moreover, additional trigger-fulfilling data is dynamically updatable in nature, were the trigger-fulfilling data can be added, updated, and/or deleted within their respective databases and/or data structures after a user has already set a particular trigger. In other words, the triggering criteria can be fulfilled, for example, by additional trigger-fulfilling data added or identified by a third party service provider after the trigger criteria has already been set by the user.

It should also be noted that the various embodiments of the present invention can be implemented to perform remote triggering. Remote triggering describes a use case scenario where a user receives a get/set reminder indicating a desired action or event when a third party enters or leaves a certain geographical area. For example, a first user can set triggering criteria to send a notification containing a message, "When you go to the shopping mall remember to buy me a new frying pan" to a second user, upon the second user leaving the home of the first and second users.

Figure 5:
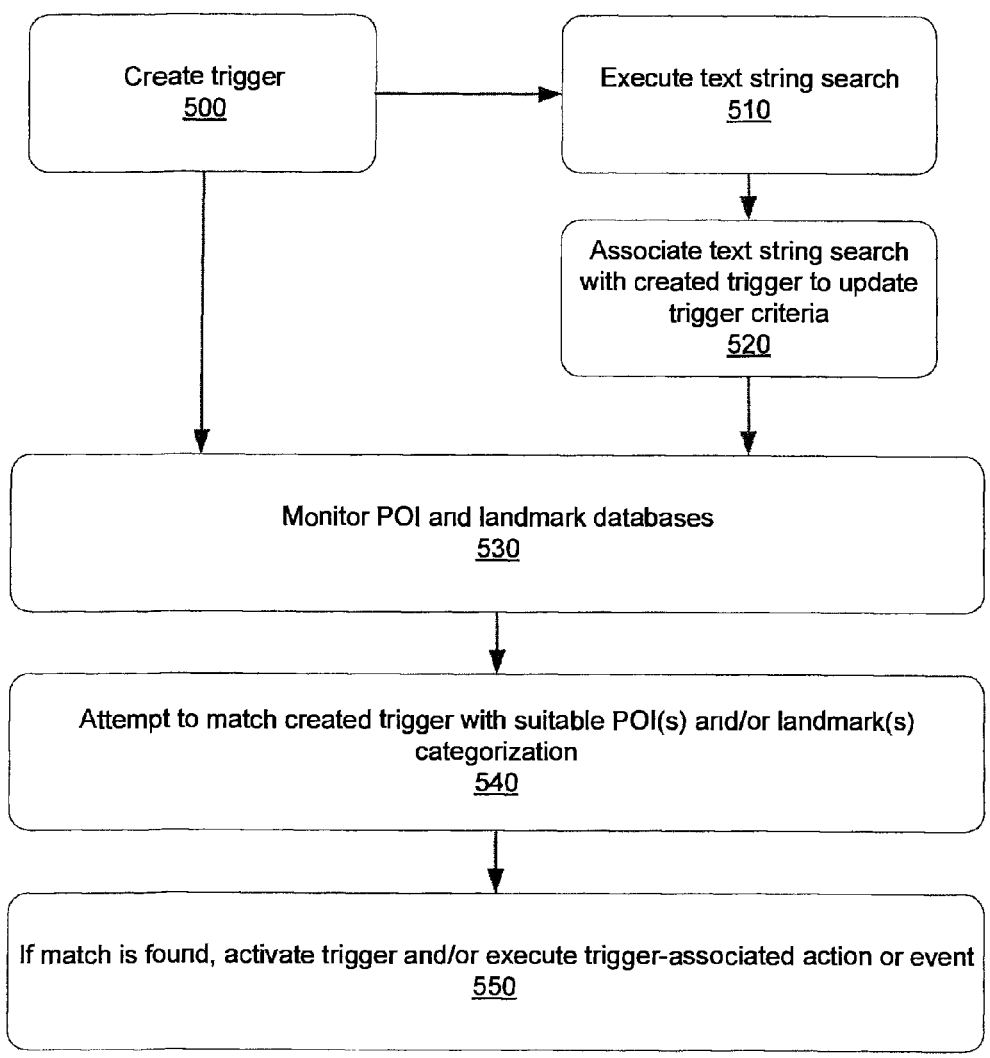
FIG. 5 illustrates a flow chart describing a method of location-based triggering performed in accordance with the various embodiments of the present invention.

FIG. 5 shows a flow chart illustrating a method of LBT in connection with the various embodiments of the present invention. At least one trigger is created at 500. Created triggers are maintained in a triggering system residing in either a user terminal/device or a network/network element. At 530, the triggering system monitors all residing POI, landmarks, and location-based information databases and/or data structures, which can reside in the user terminal/device or in a server of the network, for suitable trigger locations. At 540, the triggering system attempts to match suitable POIs and/or landmarks categorizations with the at least one trigger set in the triggering system. If at least one POI, landmark, or location-based information categorization matches the at least one trigger, any of the POIs, landmarks, and/or location-based information comprising the at least one POI, landmark, and/or location-based information categorization can be used to satisfy triggering criteria and activate the trigger at 550, and consequently, execute any related action or event. If the trigger created is tied to a search, the search can be executed once, immediately after the creation of the trigger to get the current trigger criteria at 510. When the information regarding a particular POI, landmark, and/or other category information in a database and/or data structure is modified and/or added, an update-search is executed to update the trigger criteria. This search can be incrementally performed so that only modified data in modified databases and/or data structures are captured. This aids in speeding up the operation and improves performance of the triggering system.

It should be noted that various user interfaces can be utilized in conjunction with the various embodiments of the present invention. For example, a mobile device such as a PDA or mobile telephone can be utilized to interface with the triggering system described above. Alternatively, a web browser implemented on a personal computer can also be used as a front end to the triggering system, where the web browser can access standard HyperText Markup Language (HTML)-based documents or a semantic web browser can utilize semantic web documents and addressing using Resource Description Framework (RDF), Web Ontology Language (OWL), Extensible Markup Language (XML), extensible HTML, etc.

In addition, triggers can be created on a user interface, where trigger category selectors are provided for all categories found in one or more POI, landmark, and/or location-based information databases and/or data structures. As described above, multiple categories can be selected, where one or more of the POI, landmark, and/or location-based information databases and/or data structures are accessed at any one time, and additional criteria can be utilized in conjunction with the trigger categories. For example, a geographical area can be defined (e.g., a centralized geographical location and a radius substantially about the centralized geographical location), where only places inside that geographical area are available for triggering. In addition, triggers can be added to search criteria (e.g., defined searches) or to search results.

The various embodiments of the present invention provide more end-user friendly use cases and work flows for users. In addition, the various embodiments of the present invention take into account POI and/or landmark life-times in a more dynamic way. Therefore, newly created POIs and landmarks that match trigger criteria are taken into consideration when attempting to fulfill the trigger criteria. Moreover, if a particular POI, landmark, and/or location-based information is removed from a database and/or data structure or no longer comprises a valid location, the trigger criteria defined at least in part by the particular POI and/or land mark is not necessarily invalidated (unless no other POIs and/or landmarks that can fulfill the trigger criteria exist).

It should be noted that a consideration to be taken into account with the various embodiments of the present invention, where devices, e.g., mobile devices, having limited power sources are utilized, is that more processing power or memory is needed depending on a particular implementation. Proximity detection/mapping can be utilized in such scenarios so that GPS circuitry, for example, is powered up only when the device is able to receive specified radio network cell data close to a specified trigger criteria area. The Open Mobile Alliance Secure User Plane Location (OMA SUPL) 2.0 standard includes such proximity mapping (i.e., converting some defined geological area to a corresponding Global System for Mobile Communications (GSM)/Wideband Code Division Multiple Access (WCDMA) cell info). However such proximity mapping is limited to one geographical area. As described above, the various embodiments of the present invention can require multiple geographical areas to be mapped, as well as the updating of geographical areas during a life time of a particular trigger. Therefore, the SUPL 2.0 standard can be adapted for multiple area definition retrieval.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:

creating, by a device, a location-based trigger comprising at least one trigger criteria reflecting one or more type identifiers of the location-based trigger, wherein the trigger is maintained for continued monitoring;

monitoring, by the device, a plurality of potential trigger criteria-fulfilling data, wherein the plurality of potential trigger criteria-fulfilling data may be dynamically updated during the monitoring and after being set;

comparing, by the device, the monitored plurality of potential trigger criteria-fulfilling data with the at least one trigger criteria; and activating the trigger based, at least in part, on the comparison, wherein activating the trigger includes executing a user-specified executable action of the device, and the user-specified executable action includes sending a particular notification, created by the user, to the device, wherein the plurality of potential trigger criteria-fulfilling data are stored in at least one of a dynamically updatable point of interest data structure, a dynamically updatable landmark data structure, and a dynamically updatable location-based information data structure.

2. The method of claim 1, wherein the at least one trigger criteria is associated with at least one of a point of interest, a landmark, and location-based information.

3. The method of claim 1, wherein the dynamically updatable point of interest data structure, the dynamically updatable landmark data structure, and the dynamically updatable location-based information data structure reside in at least one of the device and a network server.

4. The method of claim 1, wherein the trigger criteria and the executable action are specified by a user of the device.

5. The method of claim 1, wherein a user of the device sets a trigger criteria to send a notification containing a message to a second user upon the second user fulfilling a prescribed condition.

6. The method of claim 1, wherein the activating of the trigger occurs upon one of entering and leaving a geographical area associated with the at least one trigger criteria.

7. The method of claim 1, wherein the activating of the trigger occurs when the comparison determines that the at least one trigger criteria is fulfilled by at least one of the plurality of potential trigger criteria-fulfilling data, and when additional search criteria associated with the at least one trigger criteria is satisfied.

8. The method of claim 7, wherein the additional search criteria is obtained from at least one third party service provider.

9. The method of claim 7, wherein the additional search criteria is obtained utilizing semantic-based web data.

10. A non-transitory computer-readable storage medium carrying one or more sequences of one or more instructions which, when executed by one or more processors, cause an apparatus to at least perform the following steps:

creating a location-based trigger comprising at least one trigger criteria reflecting one or more type identifiers of the location-based trigger, wherein the trigger is maintained for continued monitoring;

monitoring a plurality of potential trigger criteria-fulfilling data, wherein the plurality of potential trigger criteria-fulfilling data may be dynamically updated during the monitoring and after being set;

comparing the monitored plurality of potential trigger criteria-fulfilling data with the at least one trigger criteria; and activating the trigger based, at least in part, on the comparison, wherein activating the trigger includes executing a user-specified executable action of the apparatus, and the user-specified executable action includes sending a particular notification, created by the user, to a device, wherein the plurality of potential trigger criteria-fulfilling data are stored in at least one of a dynamically updatable point of interest data structure, a dynamically updatable landmark data structure, and a dynamically updatable location-based information data structure.

11. An apparatus, comprising:

at least one processor; and at least one memory including computer program code, the at least one memory and the computer program code configured to, with the at least one processor, cause the apparatus to perform at least the following, creating a location-based trigger comprising at least one trigger criteria reflecting one or more type identifiers of the location-based trigger, wherein the trigger is maintained for continued monitoring;

monitoring a plurality of potential trigger criteria-fulfilling data, wherein the plurality of potential trigger criteria-fulfilling data may be dynamically updated during the monitoring and after being set;

comparing the monitored plurality of potential trigger criteria-fulfilling data with the at least one trigger criteria; and activating the trigger based, at least in part, on the comparison, wherein activating the trigger includes executing a user-specified executable action of the apparatus, and the user-specified executable action includes sending a particular notification, created by the user, to a device, wherein the plurality of potential trigger criteria-fulfilling data are stored in at least one of a dynamically updatable point of interest data structure, a dynamically updatable landmark data structure, and a dynamically updatable location-based information data structure.

12. The apparatus of claim 11, wherein the at least one trigger criteria is associated with at least one of a point of interest, a landmark, and location-based information.

13. The apparatus of claim 11, wherein the activating of the trigger occurs upon one of entering and leaving a geographical area associated with the at least one trigger criteria.

14. The apparatus of claim 11, wherein the activating of the trigger occurs when the comparison determines that the at least one trigger criteria is fulfilled by at least one of the plurality of potential trigger criteria-fulfilling data, and when additional search criteria associated with the at least one trigger criteria is satisfied, the additional search criteria includes time information that must be fulfilled to activate the trigger.

15. A system, comprising:

a device, wherein the device is configured to perform at least the following:

receiving at least one trigger criteria reflecting one or more type identifiers of the trigger criteria, and creating a location-based trigger based on the at least one trigger criteria, wherein the trigger is maintained for continued monitoring;

receiving text string search data;

updating the at least one trigger criteria with the received text string search data;

monitoring a plurality of potential trigger criteria-fulfilling data, wherein the plurality of potential trigger criteria-fulfilling data may be dynamically updated during the monitoring and after being set;

comparing the monitored plurality of potential trigger criteria-fulfilling data with the at least one updated trigger criteria; and activating the trigger based, at least in part, on the comparison, wherein activating the trigger includes executing a user-specified executable action of the device, and the user-specified executable action includes sending a particular notification, created by the user, to the device, wherein the plurality of potential trigger criteria-fulfilling data are stored in at least one of a dynamically updatable point of interest data structure, a dynamically updatable landmark data structure, and a dynamically updatable location-based information data structure.

16. The apparatus of claim 11, wherein the trigger criteria and the executable action are specified by a user of the apparatus.

17. The apparatus of claim 11, wherein a user of the device sets a trigger criteria to send a notification containing a message to a second user upon the second user fulfilling a prescribed condition.

18. The system of claim 15, wherein the trigger criteria and the executable action are specified by a user of the device.

19. A method, comprising:

creating, by a device, a trigger comprising at least one trigger criteria, wherein the at least one trigger criteria comprises at least one category related to at least one characteristic associated with at least one of either a point of interest, a landmark, and location-based information;

monitoring a plurality of potential trigger criteria-fulfilling data, wherein, the plurality of potential trigger criteria-fulfilling data may be dynamically updated during the monitoring and after being set;

comparing the monitored plurality of potential trigger criteria-fulfilling data with the at least one trigger criteria; and activating the trigger when at least one of the monitored plurality of potential trigger criteria-fulfilling data matches the at least one trigger criteria.

* * * * *